(12) United States Patent
Shu et al.

(10) Patent No.: US 9,122,120 B2
(45) Date of Patent: Sep. 1, 2015

(54) ELECTROPHORETIC DISPLAY APPARATUS

(71) Applicant: E Ink Holdings Inc., Hsinchu (TW)

(72) Inventors: Fang-An Shu, Hsinchu (TW);
Ted-Hong Shinn, Hsinchu (TW);
Kuan-Yi Lin, Hsinchu (TW);
Tzung-Wei Yu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/205,385

(22) Filed: Mar. 12, 2014

(65) Prior Publication Data
US 2015/0109658 A1 Apr. 23, 2015

(30) Foreign Application Priority Data
Oct. 18, 2013 (TW) .............................. 102137737 A

(51) Int. Cl.
| G02B 26/00 | (2006.01) |
| G09G 3/34 | (2006.01) |
| G02F 1/167 | (2006.01) |
| G02F 1/1335 | (2006.01) |

(52) U.S. Cl.
CPC .......... *G02F 1/167* (2013.01); *G02F 1/133514* (2013.01); *G02F 2001/1672* (2013.01)

(58) Field of Classification Search
USPC ........................ 359/290–296, 245; 345/107
See application file for complete search history.

(56) References Cited

U.S. PATENT DOCUMENTS

| 7,248,314 | B2 | 7/2007 | Yun |
| 7,821,553 | B2 | 10/2010 | Ellis-Monaghan et al. |
| 8,179,365 | B2 | 5/2012 | Lee et al. |
| 8,780,437 | B1 * | 7/2014 | Lo et al. ........................ 359/296 |
| 8,797,634 | B2 * | 8/2014 | Paolini et al. ................. 359/296 |
| 8,860,658 | B2 * | 10/2014 | Hage et al. .................... 345/107 |
| 8,902,153 | B2 * | 12/2014 | Bouchard et al. ............. 345/107 |
| 2006/0268203 | A1 | 11/2006 | Kurahashi et al. |
| 2008/0084376 | A1 | 4/2008 | Hirota |

FOREIGN PATENT DOCUMENTS

CN 1774664 A 5/2006

OTHER PUBLICATIONS

Corresponding Taiwanese Office Action that these art references were cited.

* cited by examiner

*Primary Examiner* — Mohammed Hasan
(74) *Attorney, Agent, or Firm* — CKC & Partners Co., Ltd.

(57) ABSTRACT

An electrophoretic display apparatus includes a driving substrate, an electrophoretic display medium layer and a color resist layer. The electrophoretic display medium layer is disposed on the driving substrate. The color resist layer is disposed on the electrophoretic display medium layer. The color resist layer includes pixel zones. The pixel zones include a first color zone, a second color zone, a third color zone, a fourth color zone and a vacant zone. The first color one and the third color zone are respectively positioned on two opposite edges of the vacant zone. The second color zone and the fourth color zone are respectively positioned on another two opposite edges of the vacant zone. The first color zone, the second color zone, the third color zone and the fourth color zone have different colors.

10 Claims, 4 Drawing Sheets

ELECTROPHORETIC DISPLAY APPARATUS

RELATED APPLICATIONS

This application claims priority to Taiwanese Application Serial Number 102137737, filed Oct. 18, 2013, which is herein incorporated by reference.

BACKGROUND

1. Technical Field

Embodiments of the present disclosure relate to a display apparatus. More particularly, the embodiments of the present disclosure relate to an electrophoretic display apparatus.

2. Description of Related Art

An electrophoretic display apparatus includes an electronic ink layer. The electronic ink layer includes microcapsules each of which includes white charged particles and black charged particles. By controlling an external electrical field, the white charged particles and the black charged particles can be moved to show desired grayscales.

In order to show a colored image, a color resist layer may be disposed on the electronic ink layer. The color resist layer includes red photoresist zones, green photoresist zones and blue photoresist zones collocated to enable the electrophoretic display apparatus to show the colored image. The red photoresist zones, the green photoresist zones and the blue photoresist zones are typically arranged as striped patterns. However, such design is very likely to cause a display apparatus to show striped patterns when an image is displayed on the display apparatus, thus degrading the display quality.

SUMMARY

One aspect of the present disclosure is to remove striped patterns in an image displayed on an electrophoretic display apparatus, in which the striped patterns are caused by color photoresists.

In accordance with one embodiment of the present disclosure, an electrophoretic display apparatus includes a driving substrate, an electrophoretic display medium layer and a color resist layer. The electrophoretic display medium layer is disposed on the driving substrate. The color resist layer is disposed on the electrophoretic display medium layer. The color resist layer has at least one pixel zone which has a first color zone, a second color zone, a third color zone, a fourth color zone and a vacant zone. The vacant zone has a first edge, a second edge, a third edge and a fourth edge sequentially connected to each other. The first color zone and the third color zone are respectively positioned on the first edge and the third edge of the vacant zone. The second color zone and the fourth color zone are respectively positioned on the second edge and the fourth edge of the vacant zone. The first color zone, the second color zone, the third color zone and the fourth color zone have different colors.

In the aforementioned pixel zone, the first color zone, the second color zone, the third color zone and the fourth color zone surround the vacant zone for color mixing, thereby preventing the striped patterns from being seen by a user when an image is displayed. As such, the aforementioned embodiment can remove the striped patterns caused by the photoresists in the image shown on the conventional electrophoretic display apparatus.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
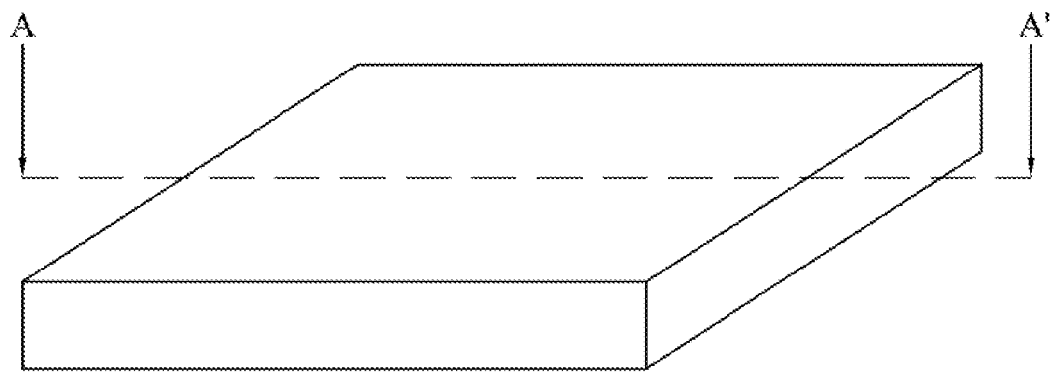
FIG. 1 is a 3D view of an electrophoretic display apparatus in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
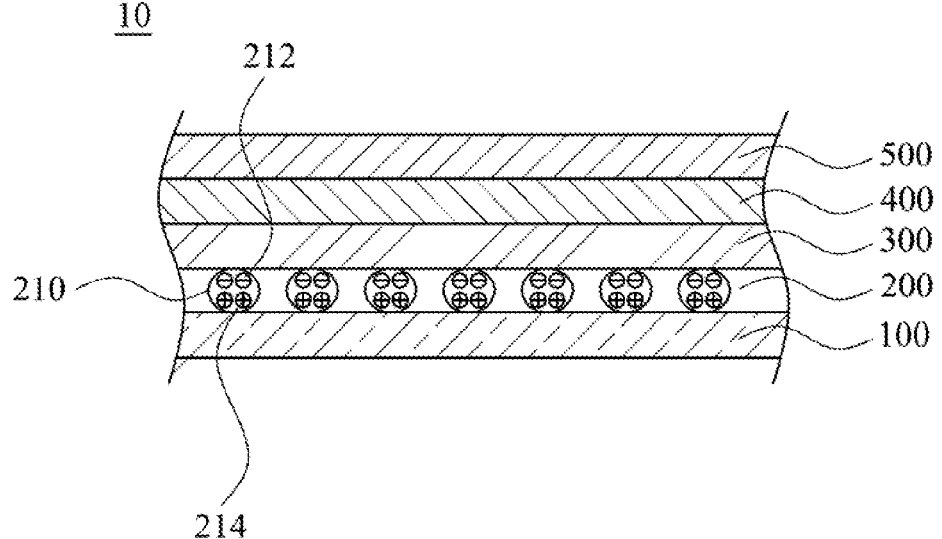
FIG. 2 is a cross-sectional view of the electrophoretic display apparatus viewed along A-A' line in FIG. 1.

FIG. 1 is a perspective view of the electrophoretic display apparatus 10 in accordance with one embodiment of the present disclosure. FIG. 2 is a cross-sectional view of the electrophoretic display apparatus viewed along A-A' line in FIG. 1. As shown in FIG. 2, in this embodiment, the display apparatus 10 includes a driving substrate 100, an electrophoretic display medium layer 200 and a color resist layer 300. The electrophoretic display medium layer 200 is disposed on the driving substrate 100, and can be controlled to be at a bright state or a dark state by an electrical field generated by an electrode of the driving substrate 100. The color resist layer 300 is disposed on the electrophoretic display medium layer 200 for filtering a portion of wavelengths of light, thereby enabling a user to see a colored image when the electrophoretic display medium layer 200 is at the bright state.

Figure 3:
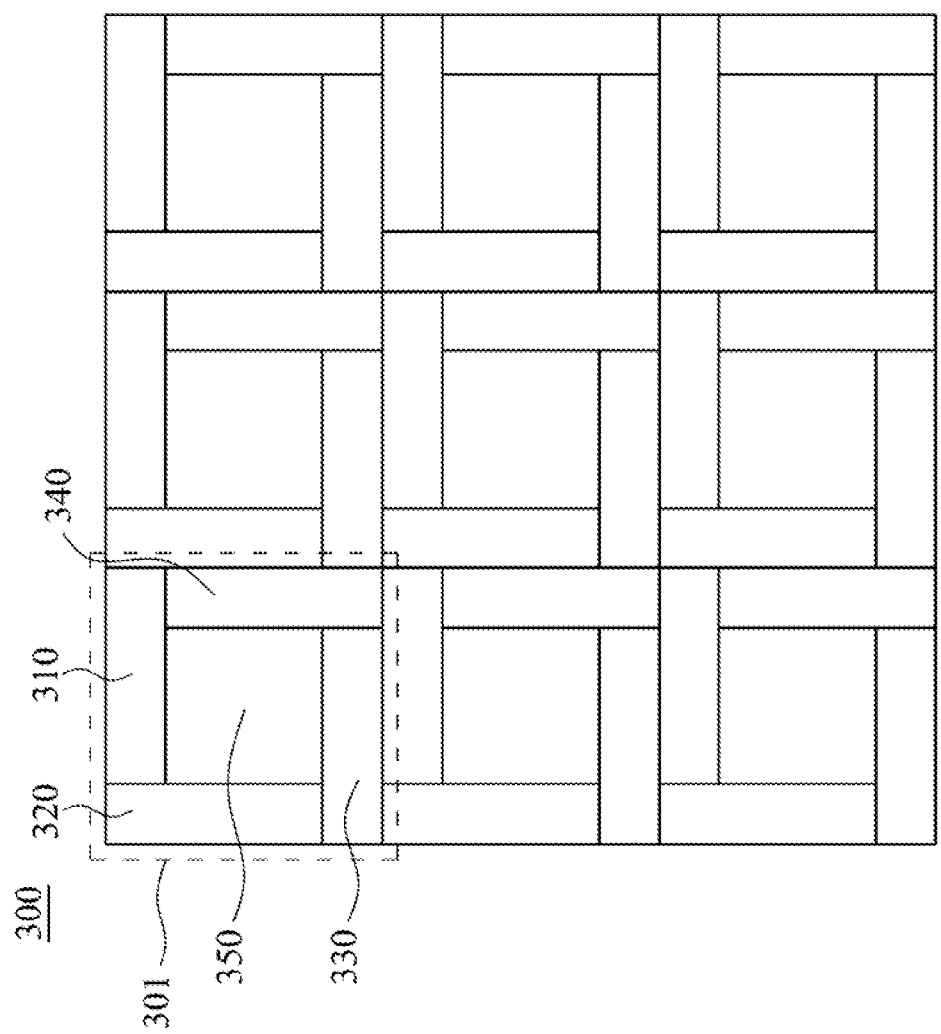
FIG. 3 is a top view of a color resist layer in FIG. 2.

FIG. 3 is a top view of the color resist layer 300 in FIG. 2. As shown in FIG. 3, the color resist layer 300 includes at least one pixel zone 301. In this embodiment, each pixel zone 301 includes a first color zone 310, a second color zone 320, a third color zone 330, a fourth color zone 340 and a vacant zone 350. The first color zone 310, the second color zone 320, the third color zone 330 and the fourth color zone 340 have different colors. For example, the first color zone 310, the second color zone 320, the third color zone 330 and the fourth color zone 340 may have photoresist presenting different colors. The vacant zone 350 does not have any photoresist, so as to facilitate the light to travel through and to increase the brightness. The first color zone 310, the second color zone 320, the third color zone 330 and the fourth color zone 340 may surround the vacant zone 350, so as to facilitate the mixing of the colors, which prevents the user from seeing the striped patterns when the electrophoretic display medium layer 200 (See FIG. 2) is bright.

Figure 4:
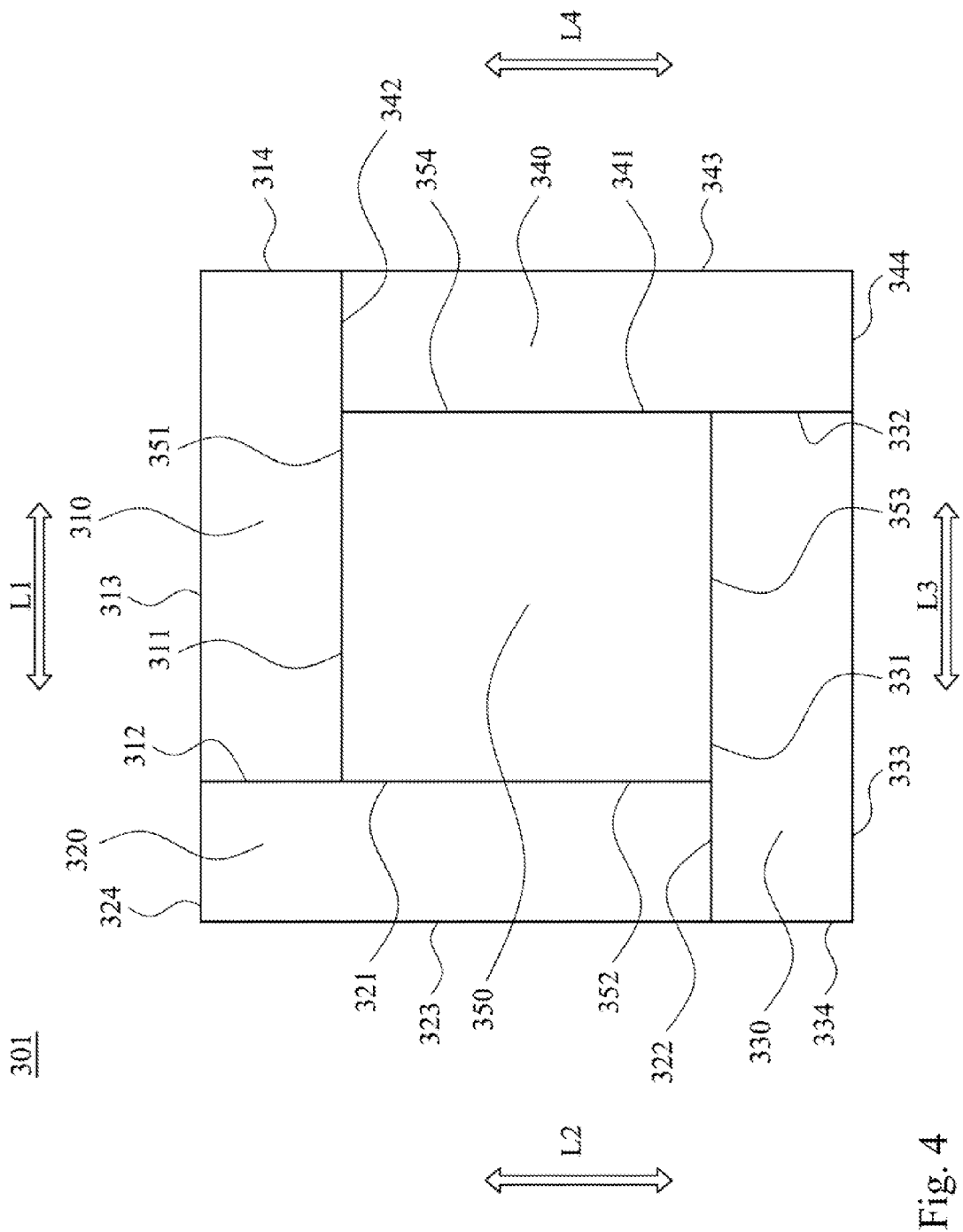
FIG. 4 is a top view of a pixel zone in FIGS. 3.

FIG. 4 is a top view of the pixel zone 301 in FIG. 3. In each pixel zone 301 the first color zone 310 and the third color zone 330 are positioned on two opposite sides of the vacant zone 350, such as the upper side and the lower side of the vacant zone 350. The second color zone 320 and the fourth color zone 340 are positioned on another two opposite sides of the vacant zone 350, such as the left side and the right side of the vacant zone 350, thereby facilitating to mix colors and preventing the striped patterns from being shown on the displayed image.

Specifically speaking, as shown in FIG. 4, the vacant zone 350 has a first edge 351, a second edge 352, a third edge 353 and a fourth edge 354 sequentially connected to each other. In other words, the first edge 351 and the third edge 353 are opposite to each other, and the second edge 352 and the fourth edge 354 are opposite to each other as well. The first color zone 310 and the third color zone 330 are respectively positioned on the first edge 351 and the third edge 353 of the vacant zone 350. The second color zone 320 and the fourth color zone 340 are respectively positioned on the second edge 352 and the fourth edge 354 of the vacant zone 350. In such a configuration, the first color zone 310 and the third color zone 330 can be respectively positioned on the upper side and the lower side of the vacant zone 350, and the second color zone 320 and the fourth color zone 340 can be respectively positioned on the left side and the right side of the vacant zone 350.

In some embodiments, as shown in FIG. 4, the first color zone 310, the second color zone 320, the third color zone 330 and the fourth color zone 340 are rectangular. The vacant zone 350 is square. A lengthwise direction L1 of the first color zone 310 is parallel to a lengthwise direction L3 of the third color zone 330. A lengthwise direction L2 of the second color zone 320 is parallel to a lengthwise direction L4 of the fourth color zone 340. The lengthwise direction L1 of the first color zone 310 is perpendicular to the lengthwise direction L2 of the second color zone 320 and the lengthwise direction L4 of the fourth color zone 340. The lengthwise direction L3 of the third color zone 330 is perpendicular to the lengthwise direction L2 of the second color zone 320 and the lengthwise direction L4 of the fourth color zone 340.

Specifically speaking, as shown in FIG. 4, the first color zone 310 has two opposite longer sides 311 and 313, and two opposite shorter sides 312 and 314. The longer sides 311 and 313 are parallel to each other, and the shorter sides 312 and 314 are parallel to each other as well. The longer sides 311 and 313 are adjoined between the short sides 312 and 314. The second color zone 320 has two opposite long sides 321 and 323, and two opposite short sides 322 and 324. The longer sides 321 and 323 are parallel to each other, and the shorter sides 322 and 324 are parallel to each other as well. The longer sides 321 and 323 are adjoined between the short sides 322 and 324. The third color zone 330 has two opposite long sides 331 and 333, and two opposite short sides 332 and 334. The longer sides 331 and 333 are parallel to each other, and the shorter sides 332 and 334 are parallel to each other as well. The longer sides 331 and 333 are adjoined between the short sides 332 and 334. The fourth color zone 340 has two opposite longer sides 341, 343 and two opposite shorter sides 342 and 344. The longer sides 341 and 343 are parallel to each other, and the short sides 342 and 344 are parallel to each other as well. The longer sides 341 and 343 are adjoined between the short sides 342 and 344.

The longer side 311 of the first color zone 310 is adjoined to the shorter side 342 of the fourth color zone 340 and the first edge 351 of the vacant zone 350. The longer side 321 of the second color zone 320 is adjoined to the shorter side 312 of the first color zone 310 and the second edge 352 of the vacant zone 350. The longer side 331 of the third color zone 330 is adjoined to the shorter side 322 of the second color zone 320 and the third edge 353 of the vacant zone 350. The longer side 341 of the fourth color zone 340 is adjoined to the shorter side 332 of the third color zone 330 and the fourth edge 354 of the vacant zone 350. In such a configuration, the lengthwise directions L1 and L3 can be perpendicular to the lengthwise directions L2 and L4.

In some embodiments, a length of the long side 311 of the first color zone 310 is equal to a sum of lengths of the shorter side 342 of the fourth color zone 340 and the first edge 351 of the vacant zone 350. The length of the longer side 32 of the second color zone 320 is equal to a sum of lengths of the shorter side 312 of the first color zone 310 and the second edge 352 of the vacant zone 350. A length of the longer side 331 of the third color zone 330 is equal to a sum of lengths of the shorter side 322 of the second color zone 320 and the third edge 353 of the vacant zone 350. A length of the longer side 341 of the fourth color zone 340 is equal to a sum of lengths of the shorter side 332 of the third color zone 330 and the fourth edge 354 of the vacant zone 350.

In some embodiments, the first color zone 310, the second color zone 320, the third color zone 330 and the fourth color zone 340 has the same area. In other words, the first color zone 310, the second color zone 320, the third color zone 330 and the fourth color zone 340 are rectangles with the same area. The pixel zone 301 including the first color zone 310, the second color zone 320, the third color zone 330, the fourth color zone 340 and the vacant zone 350 can be square.

Figure 5:
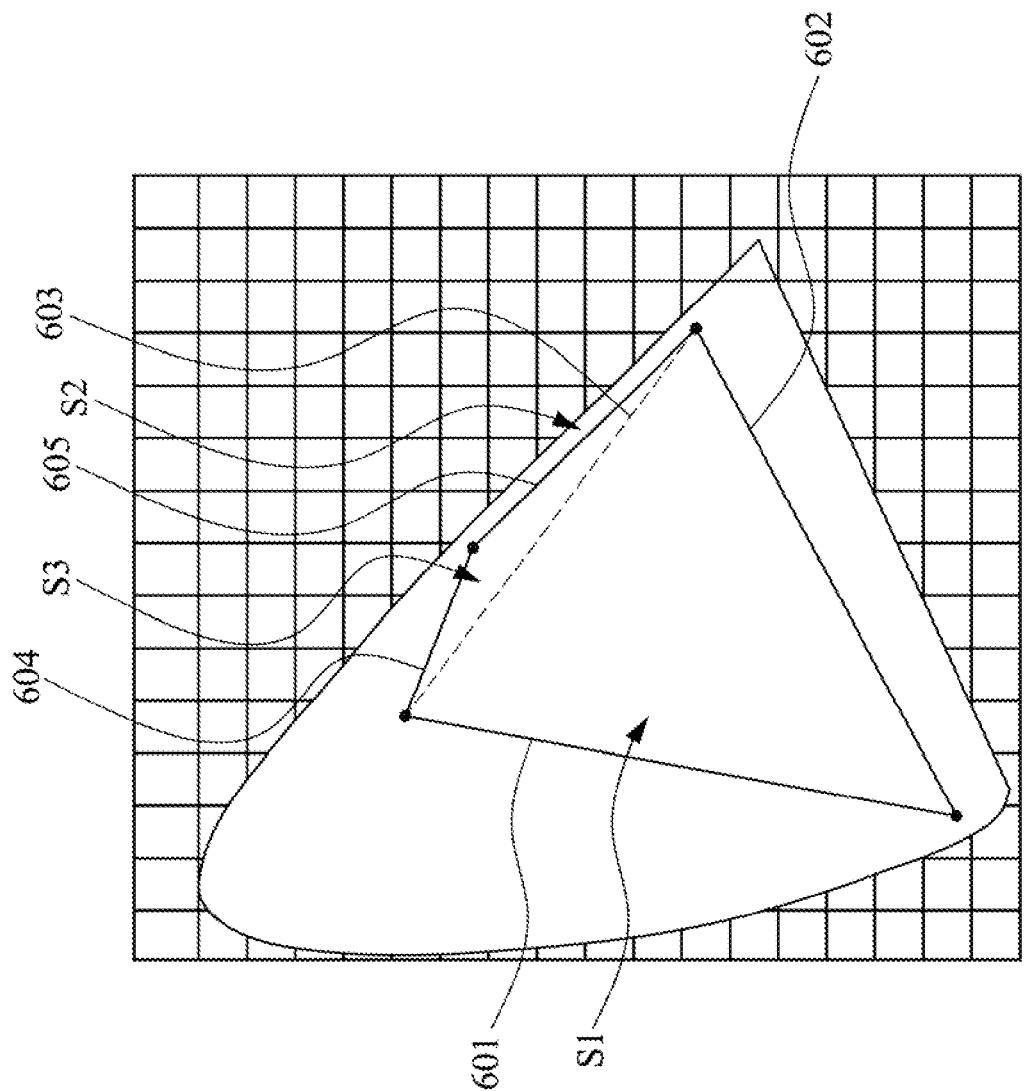
FIG. 5 is a CIE 1931 chromaticity coordinate diagram in accordance with the electrophoretic display apparatus of the present disclosure and a conventional electrophoretic display apparatus.

In some embodiments, colors of the first color zone 310, the second color zone 320, the third color zone 330 and the fourth color zone 340 can be red, yellow, blue and green, respectively. Through the shape design and the aforementioned color arrangement of the first color zone 310, the second color zone 320, the third color zone 330 and the fourth color zone 340, the color gamut can be improved. Specifically speaking, referring to FIG. 5, FIG. 5 is a CIE 1931 chromaticity coordinate diagram in accordance with the electrophoretic display apparatus of the present disclosure and a conventional electrophoretic display apparatus. As shown in FIG. 5, the color gamut S1 of the conventional electrophoretic display apparatus is defined by lines 601, 602 and 603, and the color gamut S2 of the electrophoretic display apparatus of the present disclosure is defined by lines 601, 602, 604 and 605. It can be known that the color gamut S2 has an additional color gamut S3 more than the color gamut S1. Therefore, the shape design and the aforementioned color arrangement of the first color zone 310, the second color zone 320, the third color zone 330 and the fourth color zone 340 may make the color gamut of the electrophoretic display apparatus broader.

In other embodiments, as shown in FIG. 4, colors of the first color zone 310, the second color zone 320, the third color zone 330 and the fourth color zone 340 may be respectively magenta, cyan, yellow and white, so as to provide a color gamut different from the conventional RGB color gamut.

Reference is made to FIG. 2 again. The electrophoretic display apparatus 10 further includes an adhesive layer 400 and a protective layer 500. The adhesive layer 400 is disposed on the color resist layer 300. The protective layer 500 is disposed on the adhesive layer 400. In other words, the protective layer 500 can be adhered to the color resist layer 300 by the adhesive layer 400, so as to protect the color resist layer 300. The adhesive layer 400 may be, but is not limited to, an optically clear adhesive (OCA). The protective layer 500 may be, but is not limited to, a cover lens.

In some embodiments, as shown in FIG. 2, the electrophoretic display medium layer 200 includes microcapsules 210. The microcapsules 210 are positioned between the driving substrate 100 and the color resist layer 300. Each of the microcapsules 210 includes light colored charged particles 212 and deep colored charged particles 214. The light colored charged particles 212 and the deep colored charged particles 214 have different types of electric charges. For example, the light colored charged particles 212 may be white particles with negative charges, and the deep colored charged particles 214 may be black particles with positive charges.

During operation, by controlling the electrical field generated by the electrode disposed on the driving substrate 100, the bright colored charged particles 212 can be positioned above the deep colored charged particles 214 (namely, the bright colored charged particles 212 are closer to the color resist layer 300 than the deep colored charged particles 214 are), or, the deep colored charged particles 214 can be positioned above the bright colored charged particles 212 (namely, the deep colored charged particles 214 are closer to the color resist layer 300 than the bright colored charged particles 212 are), so as to adjust the brightness of the electrophoretic display apparatus 10. In some embodiments, the driving substrate 100 may be, but is not limited to, a TFT (Thin-Film-Transistor) array substrate.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrophoretic display apparatus, comprising:
   a driving substrate;
   an electrophoretic display medium layer disposed on the driving substrate; and
   a color resist layer disposed on the electrophoretic display medium layer, the color resist layer having at least one pixel zone, the pixel zone having a first color zone, a second color zone, a third color zone, a fourth color zone and a vacant zone, the vacant zone having a first edge, a second edge, a third edge and a fourth edge sequentially connected to each other, the first color zone and the third color zone being respectively positioned on the first edge and the third edge of the vacant zone, the second color zone and the fourth color zone being respectively positioned on the second edge and the fourth edge of the vacant zone, wherein the first color zone, the second color zone, the third color zone and the fourth color zone have different colors.

2. The electrophoretic display apparatus of claim 1, wherein the first color zone, the second color zone, the third color zone and the fourth color zone are rectangular, and a lengthwise direction of the first color zone is parallel to a lengthwise direction of the third color zone, and a lengthwise direction of the second color zone is parallel to a lengthwise direction of the fourth color zone, and the lengthwise direction of the first color zone is perpendicular to the lengthwise direction of the second color zone.

3. The electrophoretic display apparatus of claim 2, wherein the vacant zone is square.

4. The electrophoretic display of claim 2, wherein the first color zone, the second color zone, the third color zone and the fourth color zone has the same area.

5. The electrophoretic display of claim 1, wherein a longer side of the first color zone adjoins a shorter side of the fourth color zone and the first edge of the vacant zone, and a longer side of the second color zone adjoins a shorter side of the first color zone and the second edge of the vacant zone, and a longer side of the third color zone adjoins a shorter side of the second color zone and the third edge of the vacant zone, and a longer side of the fourth color zone adjoins a shorter side of the third color zone and the third edge of the vacant zone.

6. The electrophoretic of claim 5, wherein a length of the longer side of the first color zone is equal to a sum of lengths of the shorter side of the fourth color zone and the first edge of the vacant zone, and a length of the longer side of the second color zone is equal to a sum of lengths of the shorter side of the first color zone and the second edge of the vacant zone, and a length of the longer side of the third color zone is equal to a sum of lengths of the shorter side of the second color zone and the third edge of the vacant zone, and a length of the long side of the fourth color zone is equal to a sum of lengths of the shorter side of the third color zone and the fourth edge of the vacant zone.

7. The electrophoretic display of claim 1, wherein colors of the first color zone, the second color zone, the third color zone and the fourth color zone are respectively red, yellow, blue and green.

8. The electrophoretic display of claim 1, wherein colors of the first color zone, the second color zone, the third color zone and the fourth color zone are respectively magenta, cyan, yellow and white.

9. The electrophoretic display apparatus of claim 1, further comprising:
   an adhesive layer disposed on the color resist layer; and
   a protective layer disposed on the adhesive layer.

10. The electrophoretic display of claim 1, wherein the electrophoretic display medium layer comprises a plurality of microcapsules positioned between the driving substrate and the color resist layer, and each of the microcapsules comprises a plurality of light colored charged particles and a plurality of deep colored charged particles, wherein the light colored charged particles and the deep colored charged particles have different types of electric charges.

\* \* \* \* \*